(12) United States Patent
Park

(10) Patent No.: US 8,229,280 B2
(45) Date of Patent: Jul. 24, 2012

(54) METHOD OF PERFORMING TIME-SHIFT FUNCTION AND TELEVISION RECEIVER USING THE SAME

(75) Inventor: Dae Suk Park, Daegu (KR)

(73) Assignee: LG Electronics Inc., Seoul (KR)

( * ) Notice: Subject to any disclaimer, the term of this patent is extended or adjusted under 35 U.S.C. 154(b) by 1251 days.

(21) Appl. No.: 11/525,129

(22) Filed: Sep. 22, 2006

(65) Prior Publication Data

US 2007/0133938 A1 Jun. 14, 2007

(30) Foreign Application Priority Data

Dec. 12, 2005 (KR) ........................ 10-2005-0121578

(51) Int. Cl.
*H04N 5/76* (2006.01)
(52) U.S. Cl. ........................................ 386/291; 386/294
(58) Field of Classification Search ........................ None
See application file for complete search history.

(56) References Cited

U.S. PATENT DOCUMENTS

| | | | |
|---|---|---|---|
| 6,971,121 B2 | 11/2005 | West et al. | |
| 2002/0094191 A1 | 7/2002 | Horie et al. | |
| 2002/0174430 A1* | 11/2002 | Ellis et al. | 725/46 |
| 2003/0023987 A1 | 1/2003 | Hiramoto et al. | |
| 2006/0064716 A1* | 3/2006 | Sull et al. | 725/37 |

FOREIGN PATENT DOCUMENTS

| | | |
|---|---|---|
| CN | 1536886 A | 10/2004 |
| EP | 1465417 A2 | 10/2004 |
| KR | 1020050003210 A | 1/2005 |
| WO | 00/58967 A1 | 10/2000 |
| WO | WO-03/081915 A1 | 10/2003 |
| WO | WO 2005069611 A1 * | 7/2005 |

* cited by examiner

*Primary Examiner* — William C Vaughn, Jr.
*Assistant Examiner* — Heather Jones
(74) *Attorney, Agent, or Firm* — Birch, Stewart, Kolasch & Birch, LLP

(57) ABSTRACT

A method of performing a time-shift function and a television receiver using the same facilitates a selective playback of a specific one among a plurality of broadcast programs stored for the time-shift function. The television receiver includes a personal video recorder for enabling a time-shift function by storing in a time-shift storage area at least one broadcast signal received in real time; a system memory for storing broadcast program information extracted from the at least one broadcast signal stored in the personal video recorder; and a display module for displaying a time shift guide for the stored at least one broadcast signal to enable a user selection of one broadcast signal stored in the time-shift storage area. The broadcast program information is stored in the system memory in a table format, and the stored broadcast program information is updated in the system memory according to a system program execution, so that the time shift guide is displayed according to the updated broadcast program information. The television receiver also includes a controller for controlling the personal video recorder to reproduce the selected broadcast signal from a user-specified position in response to the user selection of the one broadcast signal; a user interface for inputting to the controller a command signal according to the user selection; and an OSD generator for generating OSD data for forming the time shift guide under control of the controller according to the command signal from the user interface.

20 Claims, 5 Drawing Sheets

FIG. 4
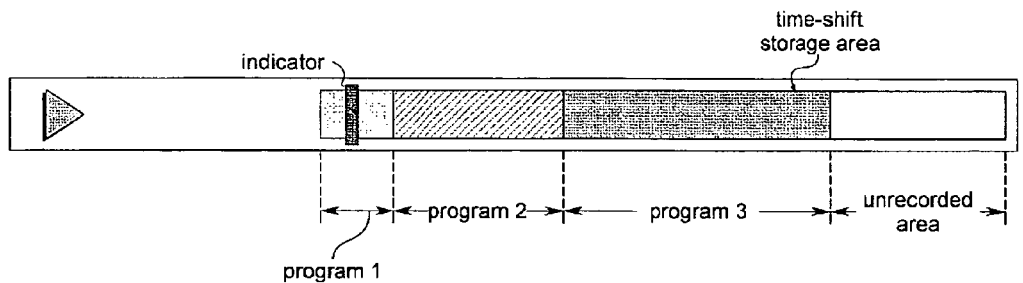
FIG. 5
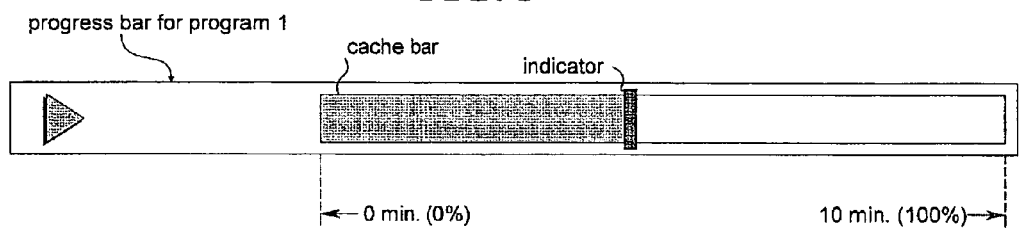
FIG. 6
| LIST OF PROGRAMS AVAILABLE FOR TIME-SHIFTING | |
|---|---|
| program 1 image/thumbnail | DTV; cable channel 6-1.; "Sitcom Title" (episode No.); 22:16~22:26; other information |
| program 2 image/thumbnail | DTV; cable channel 7-1.; "Sports News"; 22:26~22:58; other information |
| program 3 image/thumbnail | DTV; cable channel 9-1.; "Movie Title"; 22:58~01:35; other information |
| ⋮ | ⋮ |

METHOD OF PERFORMING TIME-SHIFT FUNCTION AND TELEVISION RECEIVER USING THE SAME

This application claims the benefit of Korean Patent Application No. 10-2005-0121578, filed on Dec. 12, 2005, which is hereby incorporated by reference as if fully set forth herein.

BACKGROUND OF THE INVENTION

1. Field of the Invention

The present invention relates to digital television receivers and more particularly to a method of performing a time-shift function in a television receiver.

2. Discussion of the Related Art

A television receiver provided with a personal video recorder includes a storage medium such as a hard disc drive for recording (storing) and reproducing video signals including their associated audio components. The stored signals are digital video signals that are input to the television receiver and may be broadcast signals received from a broadcast station or other signals such as those supplied from a peripheral device connected to the television receiver. In any case, the input signals are encoded for storage in a transport stream format.

For instance, a television broadcast receiver provided with a personal video recorder (PVR) may employ a hard disc drive as a storage medium to enable a received broadcast signal or an external input signal from an external player to be stored in and reproduced from the hard disc according to a time-shift function in response to a user selection input. Such a time-shift function enables playback functions of pause, reverse play, fast or slow play, and the like for displaying a real-time broadcast signal or other, similarly received, video stream.

A contemporary television receiver provided with a PVR receives a broadcast signal in real time, stores the received broadcast signal in a time-shift storage area of the PVR's storage medium, and displays a time-shift guide using on screen display (OSD) data superposed on the displayed (viewed) video signal of the broadcast signal. The time-shift guide includes a progress bar for indicating a quantity of data storage, i.e., a storage status of the broadcast signal in the time-shift storage area, and for enabling a user control of a selective playback of the stored broadcast signal to be selected for playback. The storage status of a broadcast signal is typically displayed using a cache bar, and a movable indicator is provided for designating a specific point along the progress bar, the specific point corresponding to the currently viewed broadcast signal, which is then read out from the storage medium from the corresponding point.

When executing a time-shift function in a contemporary television receiver provided with a PVR, the television receiver stores a received real-time broadcast signal in a time-shift storage area of a storage medium and uses on-screen display (OSD) data to display a time shift guide generated in correspondence with the broadcast program stored in the time-shift storage area. The time shift guide includes a progress bar that indicates a storage status of a broadcast program. If a user designates a specific point of the progress bar, the television receiver displays (reproduces) the stored broadcast program from the designated point. Namely, the television receiver is able to store a currently viewed broadcast program in real time and play back the stored contents. Therefore, a broadcast program received via a switched channel according to a user's channel switching or a changed broadcast program, e.g., a change made in accordance with the programming schedule of a broadcast station, is sequentially stored in real time within the time-shift storage area; the time-shift function, however, merely tracks (follows) a storing status of a single broadcast program, as a contiguous (uninterrupted) transport stream.

Therefore, a user has difficulty in identifying a desired playback position for a specific program and in recognizing other identifying information for a specific program, such that accurately performing the desired playback operation may be rendered impossible or otherwise impractical, particularly when there is a large number of broadcast signals stored in the hard disc. Moreover, the time shift guide as described above indicates a program's storage status only and thus can provide no identifying information for a stored broadcast program, for example, program title or detailed storage time. As a result, it is difficult to select a specific broadcast program for playback, since there is no identifying information made available to the user.

SUMMARY OF THE INVENTION

Accordingly, the present invention is directed to a method of performing a time-shift function and a television receiver using the same that substantially obviates one or more problems due to limitations and disadvantages of the related art.

An object of the present invention is to provide a method of performing a time-shift function and a television receiver using the same, by which information of a plurality of broadcast programs stored for the time-shift function can be simultaneously recognized.

Another object of the present invention is to provide a method of performing a time-shift function and a television receiver using the same, which facilitates a selective playback of a specific one among a plurality of broadcast programs stored for the time-shift function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, broadcast program information corresponding to a plurality of broadcast programs stored in a time-shift storage area of a hard disc is prestored in a system memory to facilitate execution of a time-shift function. In response to a user request, the stored program information is collectively displayed as a time shift guide, which includes information indicating a storage quantity of a specific broadcast program as well as other program identifying information, thereby facilitating a user selection of a specific one of the stored broadcast programs as desired.

According to another aspect of the present invention, there is provided a method of performing a time-shift function in a television receiver having a personal video recorder enabling a time-shift function. The method comprises storing, in a time-shift storage area of the personal video recorder, at least one broadcast signal received in real time; storing, in a system memory, broadcast program information extracted from the stored at least one broadcast signal; and displaying a time shift guide for the stored at least one broadcast signal to enable a user selection of one broadcast signal stored in the time-shift storage area.

According to another aspect of the present invention, there is provided a television receiver comprising a personal video recorder for enabling a time-shift function by storing in a time-shift storage area at least one broadcast signal received in real time; a system memory for storing broadcast program information extracted from the at least one broadcast signal stored in the personal video recorder; and a display module for displaying a time shift guide for the stored at least one broadcast signal to enable a user selection of one broadcast signal stored in the time-shift storage area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram of an exemplary configuration of a time shift guide displayed as a progress bar according to the present invention;

FIG. 5 is a diagram of a progress bar proportional to a storage quantity of a broadcast program selected from the programs of the progress bar of FIG. 4; and FIG. 6 is a diagram of an exemplary table for a time shift guide according to the present invention.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

The present invention is applicable to video apparatuses capable of storing a video signal received from various input sources such as a tuner or a peripheral device. For example, a tuner 101 may be provided to receive a user-specified broadcast signal by tuning among available terrestrial or cable broadcast signals to thereby provide a digital input signal or an analog input signal, and a peripheral device such as a digital camcorder or DVD player may be connected to a television receiver via an external signal input port 102 for supplying a video signal to be stored. The video signal input to a video apparatus adopting the present invention is encoded to provide a data stream configured in a transport packet format, i.e., a plurality of serially arranged transport packets each comprising a header and a payload. While a digital broadcast signal as provided from a broadcast station is already configured in a transport stream format, an analog broadcast signal may be encoded locally. The video signal from a peripheral device may require similar encoding prior to storage as a transport stream (TS), and for the sake of convenience, a broadcast signal as described herein may also refer to an input to the television receiver as received from the peripheral device via an external signal input port. The present invention is exemplified herein by describing a television receiver having a personal video recorder or PVR.

Figure 1A:
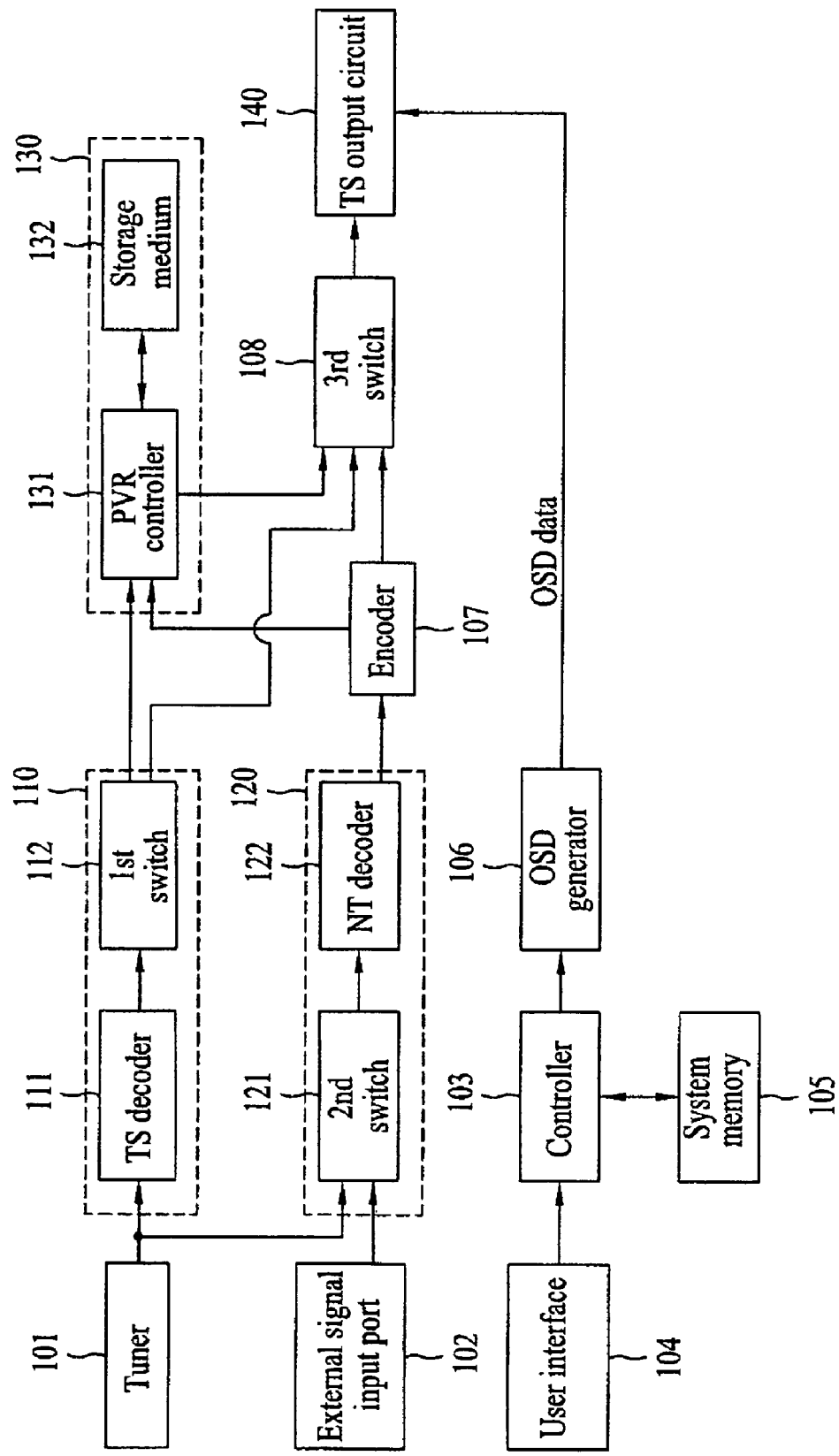
FIG. 1A is a block diagram of a television receiver having a PVR according to the present invention.

Referring to FIG. 1A, a television receiver according to the present invention may be configured to include a controller 103 for receiving a user selection signal via a user interface 104, e.g., a remote controller or local keypad, to control the system and to perform a time control function using a system memory 105 and for outputting on-screen display (OSD) data to an OSD generator 106 according to an operation of the time control function; a digital broadcast signal processor 110 for processing a digital input signal from the tuner 101, using a TS decoder 111 and a first switch 112; an analog broadcast signal processor 120 for processing an analog input signal from the tuner, using a second switch 121 and an NTSC (NT) decoder 122; a PVR unit 130, including a PVR controller 131 and a storage medium 132, for storing and reproducing the digital input signal or analog input signal (herein referred to as a broadcast signal), which may be a tuned signal input supplied from the tuner and encoded by an encoder 107 or a video signal input from the external signal input port 102 and similarly encoded; a third switch 108; and a TS output circuit 140 for outputting (displaying) a transport stream, e.g., broadcast signal, provided by the digital or analog broadcast signal processors or the PVR unit. Accordingly, as the present invention relates to a time-shift function enabled by storing a broadcast signal on one channel in real time, the following description considers for the sake of convenience that a broadcast signal is stored in the storage medium 132, though as it will be described, other input signals similarly received by the television receiver may be similarly stored.

The controller 103 communicates with each of the above elements via a bus (not shown) for providing control signals according to a user selection made via the user interface 104 and a program stored in the system memory 105, e.g., a general memory device different from the storage medium 132, which as a rule requires a significantly greater capacity than the system memory. Accordingly, the controller 103 performs an overall control of the television broadcast receiver, and the system memory 105 stores various system information including a system program of the controller.

In addition to a system program, the system memory 105 stores address information including start and end addresses for designating a position at which each of the broadcast programs is stored within the PVR unit 130 under the control of the controller 103. Hence, the system memory 105 stores the address information of each broadcast program and broadcast program information corresponding to the program(s) stored in the PVR unit 130. In particular, the system memory 105 stores broadcast program information extracted from at least one stored broadcast signal and other broadcast program information according to system programming. At the same time, the controller 103 determines whether a previous viewing channel is the same as a current viewing channel, i.e., whether a viewing channel is switched. If the viewing channel is switched, the controller 103 generates a control signal output the OSD generator 106 to change a progress bar display type, such as its color, pattern, or other display characterization enabling a visible contrast in the displayed image, so that the progress bar proceeds using the new display characterization. Accordingly, the OSD generator 106 outputs OSD data for forming a time-shift progress bar according to the control signal from the controller 103. In doing so, the OSD generator 106 displays OSD data for forming a time shift guide for each of the at least one stored broadcast signals, using the stored broadcast program information, to enable a user to play back selectively the at least one broadcast signal stored in a time-shift storage area. If a time point (position) corresponding to one of the at least one stored broadcast signals is selected on the displayed time shift guide, the controller 103 controls the PVR unit 130 to play back the selected broadcast signal from the corresponding time point. On the other hand, if a start address corresponding to one of the at least one stored broadcast signals is selected on the displayed time shift guide, the controller 103 controls the PVR unit 130 to play back the selected broadcast signal.

The third switch 108 selects a signal to be processed by the TS output circuit 140. The selected signal may be the output of the digital signal processor 110, i.e., a received digital broadcast signal; the output of the encoder 107, i.e., a received signal such as an analog broadcast signal or peripheral device input that has been encoded into a transport stream format; or the output of the PVR unit 130, i.e., the stored transport stream that is being reproduced. That is, the third switch 108 has three inputs and one selectable output.

Figure 1B:
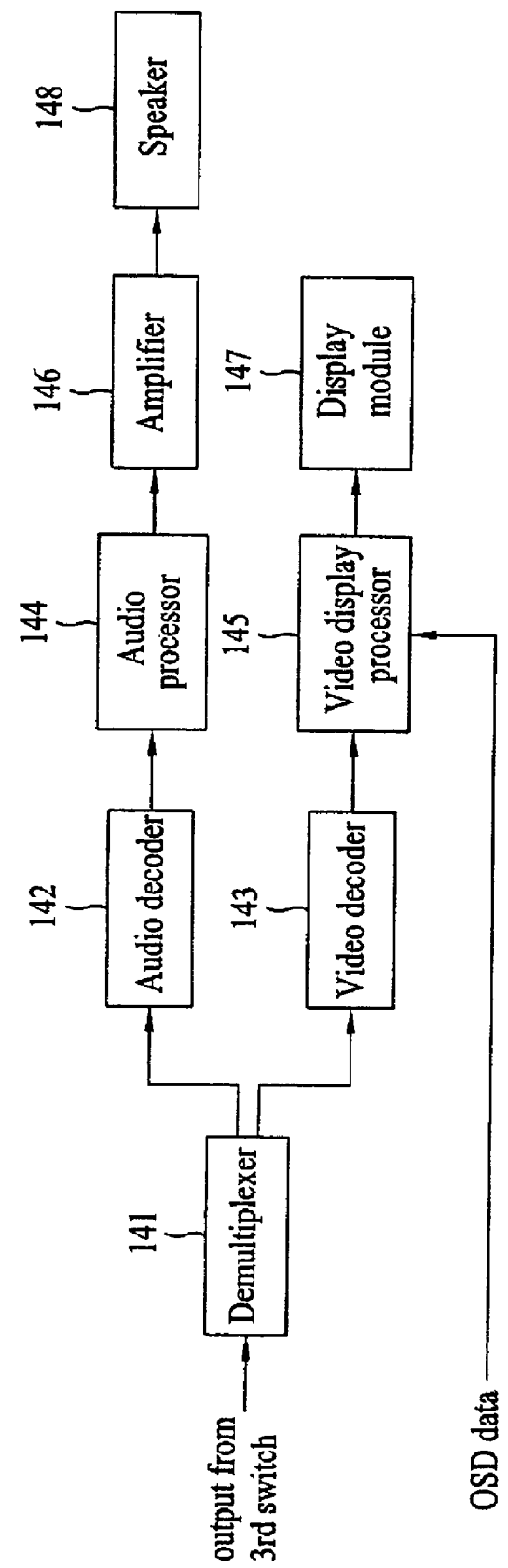
FIG. 1B is a block diagram of the TS output circuit of FIG. 1A.

An example of the TS output circuit 140 may be seen in FIG. 1B. Here, the TS output circuit 140 includes a demultiplexer 141 for outputting separated data streams, i.e., a video stream and an audio stream, an audio decoder 142, a video decoder 143, an audio processor 144, a video display processor 145, an amplifier 146, a display module 147, and a speaker 148. The audio decoder 142 and the video decoder 142 decode the data streams separately output from the demultiplexer 141 and respectively provide the decoded streams to the audio processor 144 and the video display processor 145. The audio processor 144, amplifier 146, and speaker 148 convert the decoded audio signal into an audible audio signal. The video display processor 145 processes the decoded video signal to be displayed by the display module 147, which may be a PDP module, an LCD module, or a flat CRT module, while overlaying (superposing) OSD data from the OSD generator 106, such that the OSD data is displayed together with the processed video signal.

The digital broadcast signal processor 110 receives a digital broadcast signal from the tuner 101. The TS decoder 111 of the digital broadcast signal processor 110 decodes the received signal, to output separated data streams to the first switch 112, and extracts program and system information protocol (PSIP) information from the broadcast signal. The extracted PSIP information is provided to the controller 103. The output data streams include a video stream, one or more audio streams, and a stream of additional information associated with the video and audio streams. According to a control of the controller 103, the first switch 112 selectively outputs the data streams to the PVR unit 130, to the TS output circuit 140, or to both.

The analog broadcast signal processor 120 receives an analog broadcast signal from the tuner 101 or a video signal input from the external signal input port 102. The second switch 121 of the analog broadcast signal processor 120 selects one of the two signals according to a control of the controller 103, to output the selected signal to the NT decoder 120, which decodes the received signal and outputs separated audio data and video data. This data is then encoded by the encoder 107 into a transport stream format, such as an MPEG signal, for storage the PVR unit 130 or processing by the TS output circuit 140. The encoder 107 may be incorporated into the PVR controller 131, to be alternatively embodied as a combination controller & encoder for the PVR unit 130.

The PVR unit 130 receives a digital broadcast signal from the digital broadcast signal processor 110 or a video signal input from the analog broadcast signal processor 120 and encoded by the encoder 107. Accordingly, the PVR controller 131 of the PVR unit 130 receives a transport stream and stores the received transport stream in the storage medium 132 under the control of the controller 103. A time-shift storage area allocated for executing the time-shift function is provided within the hard disc, i.e., the storage medium 132, so that a transport stream comprised of a video stream, audio stream, and additional data streams corresponding to at least one broadcast signal may be sequentially stored in the time-shift storage area in its order of reception. Addresses of the time-shift storage area, where corresponding transport streams are stored, are provided to the controller 103 by the PVR controller 131.

According to the present invention, the controller 103 controls time-shift recording information and broadcast program information for a broadcast program stored in a time-shift storage area of the storage medium 132. The time-shift recording information is stored in the system memory 105, and specifically in a time-shift recording table, according to a time-shift function execution and may include recording start time information, recording end time information, recording start address, and recording end address. The time-shift recording information of the time-shift recording table is updated each time a channel or broadcast program is changed in the course of executing a time-shift function.

Meanwhile, if a prescribed position of a progress bar of the time shift guide is designated via the user interface 104 in the course of the time-shift function execution, the controller 103 controls the OSD generator 106 to read the time-shift recording information for the stored broadcast program corresponding to the designated position and to generate OSD data for displaying (representing) a time shift guide corresponding to the broadcast program information. The displayed time shift guide is based on the time-shift recording information stored in the system memory 105 according to each broadcast signal stored in the storage medium 132 according to the time-shift function. In response to a use designation (selection) of a position of the time shift guide, the controller 103 controls the PVR controller 131 to read and play back the stored broadcast program, beginning from the designated position. If a display of a time-shift recording list is requested via the user interface 104, the controller 103 controls the OSD generator 106 to read the time-shift recording table stored in the system memory 105 and to generate OSD data to display a time-shift recording list comprised of time-shift recording information corresponding to each of a plurality of stored broadcast programs. A user selection of one set of time-shift recording information from the time-shift recording list causes the controller 103 to control the PVR controller 131 to read out and play back a broadcast signal corresponding to the selected time-shift recording information.

Accordingly, the time-shift recording table, comprising the stored broadcast program information and time-shift recording information, is stored in the system memory 105 under the control of the controller 103 and the user interface 104. Table 1 is an exemplary time-shift recording table according to the present invention, showing broadcast program information of stored broadcast programs stored in a table format in the system memory 105.

TABLE 1

| program designation | recording information | recording information | recording information | recording information | other recording information |
|---|---|---|---|---|---|
| program 1 | start time | end time | start address | end address | ... |
| program 2 | start time | end time | start address | end address | ... |
| program 3 | start time | end time | start address | end address | ... |

The above time-shift recording table includes broadcast program information extracted from a corresponding broadcast signal such as a title of each stored broadcast program (e.g., programs 1, 2, and 3), recording start and end times, recording start and end addresses, and recording other information that may be available through a channel manager (not shown) or by extracting and decoding PSIP information or may be obtained (updated) using an executed system program. It should be appreciated that Table 1 is merely an example of the broadcast program information of the stored broadcast programs that may be stored in the system memory 105 in a table format. The stored broadcast program information of the above table may include at least one of a corresponding broadcast program title, an overall start time of the corresponding broadcast program, an overall end time of the corresponding broadcast program, a channel number, a storage start time, a storage end time, a representative image or thumbnail, genre or category information, viewer rating information, caption information (e.g., "captioning present" and language designations), a broadcast program synopsis, a cast of players, a broadcast system type (e.g., an analog or digital signal broadcast), and a broadcast reception designation (e.g., a cable television input, a satellite feed, a terrestrial wave, or an auxiliary input source). The time-shift recording table of the present invention can be updated using time-shift recording information obtained in recording broadcast programs as received.

Figure 2:
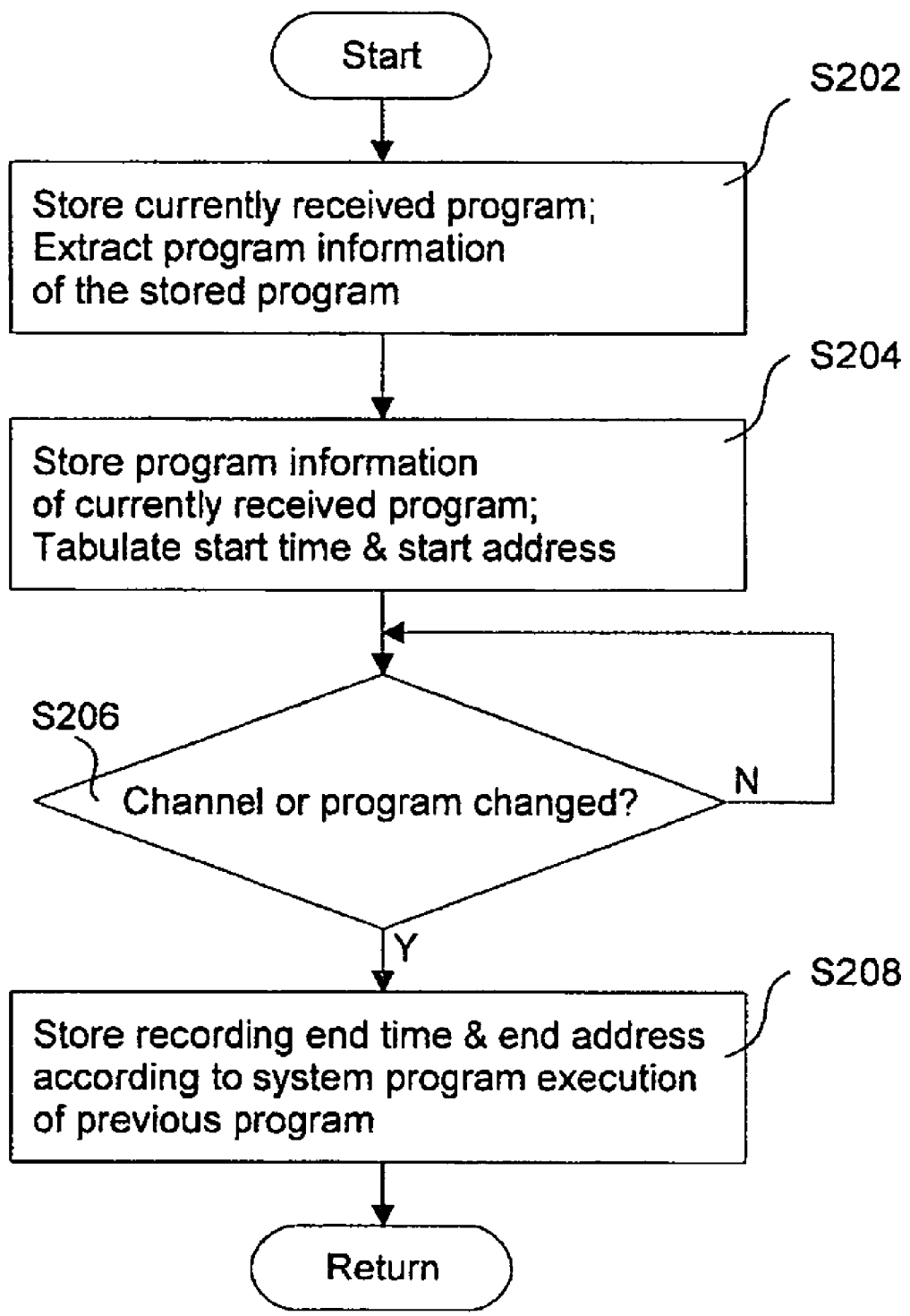
FIG. 2 is a flowchart of a process for storing broadcast program information of broadcast signals that are being stored to perform a time-shift function.

FIG. 2 illustrates a method of performing a time-shift function in a television receiver including a PVR according to the present invention, whereby broadcast program information (or "program information") is stored as time-shift recording information in response to a user command to execute a time-shift function via the user interface 104. That is, upon execution of a time-shift function input during reception of a broadcast signal, the controller 103 controls the PVR unit 130 to store in the storage medium 132 a broadcast program of a currently received broadcast signal (the "broadcast signal," which may be an analog or digital video signal received via the tuner 101 or the external signal input port 102) and searches the stored broadcast signal for program information of the currently received broadcast program, to extract program information according to an executed system program (S202). Here, the searched and extracted program information is specifically desirable information, i.e., according to a user selection made via the user interface 104, which is useful to a user in identifying the stored broadcast signal and is obtainable from the packet identifiers of the transport stream, an electronic program guide, or other PSIP information included in the broadcast signal. In the event of the received broadcast signal being an analog broadcast signal, which contains no PSIP information, the program information consists essentially of channel information. As known in the art, channel information can be obtained (extracted) via a channel manager using the system program.

Upon searching and extracting the program information of the currently received broadcast program, the controller 103 stores the obtained recording information in the system memory 105 in a table format, such as Table 1 above (S204). The recording information relates to a time-shift function and may include any information contained in PSIP information (e.g., EPG data) or information obtainable using a channel manager.

Accordingly, broadcast program information is stored in the system memory 105, and the corresponding broadcast program is stored in the PVR unit 130. While the currently received broadcast program is being stored in the PVR unit 130, the controller 103 determines whether there is a change in the received (tuned) broadcast program, for example, if there is a user request to change the channel or if there is a change in the broadcast program of the current channel (S206). If such a change is detected in the received program, the controller 103 additionally stores in the system memory 105 recording end time information, recording end address information, and other information specific to the previously viewed (and recorded) broadcast program (S208). This additionally stored recording information is stored in a table format and may represent information specific to system program execution or other information of the immediately preceding broadcast program. That is, the table of the system memory 105 is updated according to the currently received broadcast program. Immediately thereafter, the controller 103 returns (continues) to storing a broadcast program and broadcast program information received via the new channel in accordance with steps S202 and S204.

As a result, the system memory 105 stores the broadcast program information derived from each of the currently received broadcast signals. The stored program information is information, as in Table 1, that is useful for identifying and distinguishing the stored program at a later date.

Figure 3:
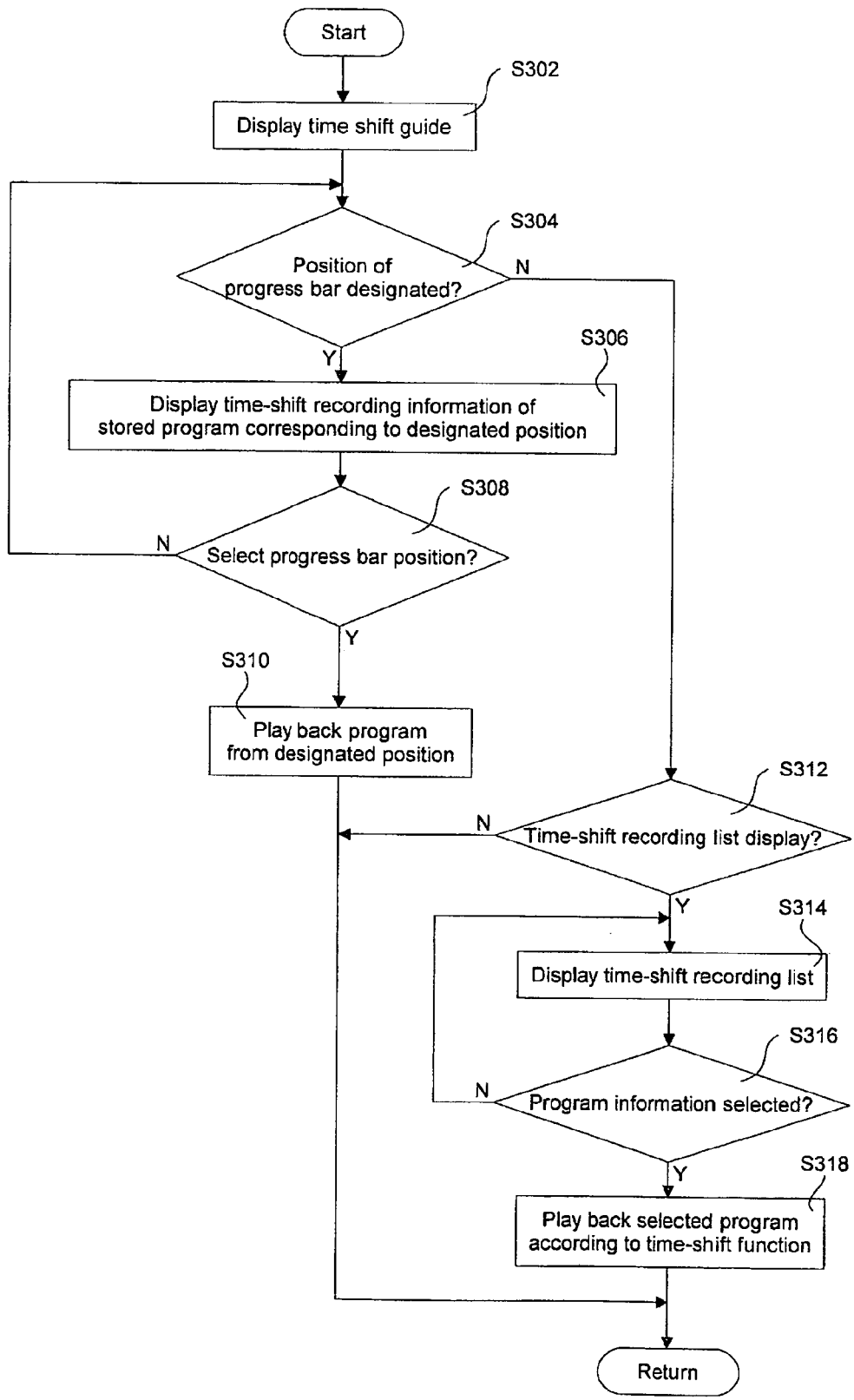
FIG. 3 is a flowchart of a process for selectively reproducing (playing back) a specific broadcast signal (program) among a plurality of stored broadcast signals.

A method of utilizing information of stored broadcast programs is described with respect to FIG. 3, illustrating a process using time-shift recording information to reproduce a specific broadcast signal among a plurality of stored broadcast signals. That is, broadcast program information (time-shift recording information), which has been stored according to the process of FIG. 2, facilitates the playback of a specific broadcast program according to a user selection and a time-shift function.

Referring to FIG. 3, in response to a user command to display a time shift guide according to a prior time-shift function execution, which is input to the controller 103 via the user interface 104, the controller controls the OSD generator 106 to generate OSD data for displaying the time shift guide (list) for each of the stored broadcast programs (S302). Thus, the OSD generator 106 generates the OSD data for the display of the time shift guide using the program information of each of the broadcast programs previously stored in the system memory 105 and outputs the generated OSD data to the TS output circuit 140. The OSD data enables a display of information of the stored broadcast programs on the screen of the display module 147, and the displayed information may be presented as a table or a progress bar, to facilitate a user selection of a specific broadcast program as stored in the time-shift storage area and to identify a time point of the specific broadcast program. The displayed time shift guide (table or progress bar) may be opaque or have a degree of transparency according to a user selection.

FIG. 4 is an exemplary configuration of a time shift guide according to the present invention, in which time-shift recording information of all stored broadcast programs is displayed as a progress bar having delineated (separate) areas of a cache bar corresponding to the storage of a transport stream in the time-shift storage area of the storage medium 132. The progress bar has an indicator to enable a user to select a playback position (designated time point) for any of the broadcast programs stored in the time-shift storage area. Each of programs 1-3 as well as all subsequently stored programs may be alternatively or additionally labeled according to the time-shift recording information stored in the system memory 105. For example, rather than "program 1," "program 2," or "program 3," the cache bar areas of the display bar respectively corresponding to portions of the time-shift storage area may indicate information corresponding to one or more items of Table 1. That is, broadcast program information of the respective broadcast programs is displayed in correspondence to each of the cache bar areas corresponding to the stored broadcast programs, and other information, such as storage time or channel number, may be displayed in addition to or in lieu of program titles according to the time-shift recording information stored in the system memory 105 as in Table 1. Thus, the time shift guide may be a progress bar capable of illustrating storage statuses of the stored broadcast signals together with at least one broadcast program information, where the progress bar may have a length displayed in proportion to a capacity of the time-shift storage area allocated to the memory (storage medium) and where an indicator may be provided to indicate a current storage progress status or a current playback progress status.

While all the stored broadcast programs are displayed as a progress bar together with respectively identifying program information, as in FIG. 4, the controller 103 determines whether the user selects a time-shifted playback of a specific broadcast program from a designated position. That is, via the user interface 104, the user designates a playback point (S304) and then makes a playback selection (S308). If, for instance, playback of program 1 is selected, OSD data for an additional or substituting display of the time shift guide may be generated as in FIG. 5 (S306), including a cache bar proportional to a storage quantity of the corresponding program, i.e., program 1, where the indicator indicates a playback progress status of program 1. The additionally or substitutionally displayed time shift guide is imparted with a length scaled according to the storage quantity of the selected broadcast signal. Then, the controller 103 controls the PVR unit 130 to access the storage medium 132 and play back the broadcast program from a time point corresponding to the designated position on the progress bar (S310).

Meanwhile, the controller 103 is also capable of simultaneously or alternatively displaying the time shift guide as a table. For this, the controller 103 determines whether the user inputs via the user interface 104 a command signal to display the time shift guide as a list of programs available for time-shifting, i.e., a time-shift recording list, which may be displayed as a progress bar as in FIGS. 4 and 5 or as a table as in FIG. 6. The controller 103 determines which type of a display is desired by the user (S312). For a user selection of the time-shift recording list to be displayed in a table format, the controller 103 controls the OSD generator 106 to read from the system memory 105 the broadcast program information for all the stored broadcast programs and to generate OSD data for displaying the read program information in a table format (S314).

Referring to FIG. 6, an exemplary table for a time shift guide according to the present invention enables the display of broadcast program information of each of the stored broadcast programs. Such broadcast program information may include the type broadcasting system, e.g., a digital broadcast (DTV); the channel number; the specific program title; and the storage start and end times. It is apparent to those skilled in the art that, using broadcast program information stored in the system memory 105, such a table may include additional or alternative information depending on the program information made available by the broadcaster. The time shift guide is displayed in the table format enabling all broadcast program information of the at least one stored broadcast signal to be easily recognized by a user, thereby facilitating playback selections.

While displaying the time shift guide as described above, the controller 103 determines which broadcast program is selected (S316). Based on the selection, the controller 103 controls the PVR controller 131 to obtain a storage start address and a storage end address for the selected broadcast program from the time-shift recording information (broadcast program information) stored in the system memory 105, to read from the storage medium 132 the broadcast program from the storage start address to the storage end address, and to play back the read broadcast program (S318).

By adopting the present invention, information for all broadcast programs stored for a time-shift function is presented to a user via a time shift guide, thereby facilitating a user selection of a playback of a specific program. Moreover, additional information, such as storage times, corresponding to each broadcast program can be provided in a table format displayed via one OSD image.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of performing a time-shift function in a television receiver having a personal video recorder enabling a time-shift function, the method comprising:
 receiving, via a network interface, a first broadcast program having audio and video data, wherein the first broadcast program corresponds to a current broadcast program;
 demultiplexing and decoding the received audio and video data;
 processing the decoded audio data into an audible data and the decoded video data into a displayable data;
 storing, in a memory, a group comprised of second broadcast programs, wherein the second broadcast programs correspond to previously stored broadcast programs;
 receiving, via a user interface, a user's command signal;
 accessing, via a controller, the memory and forwarding the group comprised of second broadcast programs to an on-screen display (OSD) generator if the user's command signal is received;
 generating, via the OSD generator, a time-shift guide OSD for the previously stored broadcast programs, wherein the time-shift guide OSD has a single progress bar for the previously stored broadcast programs, and an indicator of the single progress bar is movable in multiple regions corresponding each of the previously stored broadcast programs;

displaying, via a display module, simultaneously both the video data in the first broadcast program and the time-shift guide OSD corresponding to the group comprised of second broadcast programs, wherein the time-shift guide OSD comprises an additional region indicating an available memory space;

displaying first thumbnail image data in the time-shift guide OSD if the indicator is positioned at a first region among the multiple regions, wherein a position of the first thumbnail image data is changeable depending on a position of the indicator; and displaying second thumbnail image data in the time-shift guide OSD if the indicator is positioned at a second region among the multiple regions, wherein a position of the second thumbnail image data is changeable depending on a position of the indicator.

2. The method of claim 1, further comprising:
updating information of the group comprised of second broadcast programs according to a system program execution,
wherein a reproducing is performed from a start address of the group comprised of second broadcast programs.

3. The method of claim 2, wherein the displayed time-shift guide OSD comprises the updated information.

4. The method of claim 1, wherein the time-shift guide OSD includes information of the group comprised of second broadcast programs.

5. The method of claim 1, further comprising:
reproducing a selected broadcast program in response to the user's command signal.

6. The method of claim 5, further comprising:
specifying, according to a user designation, a position of the group comprised of second broadcast programs,
wherein the reproducing is performed from the specified position.

7. The method of claim 5, wherein information of the group comprised of second broadcast programs includes a start address and an end address of the group comprised of second broadcast programs.

8. The method of claim 7, further comprising:
specifying, according to a user designation, a set of information corresponding to the group comprised of second broadcast programs.

9. The method of claim 1, wherein information of the group comprised of second broadcast programs further comprises at least one of a title of the group comprised of second broadcast programs, an overall start time of the group comprised of second broadcast programs, an overall end time of the group comprised of second broadcast programs, a channel number, a storage start time, a storage end time, a representative image, genre information, viewer rating information, caption information, a broadcast program synopsis, a cast of players, a broadcast system type, and a broadcast reception designation.

10. The method of claim 1, wherein the progress bar indicates one of a current storage status and a current playback status of the group comprised of second broadcast programs.

11. The method of claim 10, wherein information that is extracted from the group comprised of second broadcast programs is displayed in correspondence to the progress bar.

12. The method of claim 10, wherein the progress bar is displayed according to the user's command of the group comprised of second broadcast programs.

13. The method of claim 12, wherein the displayed progress bar is proportional to a storage quantity of the group comprised of second broadcast programs.

14. The method of claim 10, wherein the displayed progress bar is proportional to an allocated storage capacity of a time-shift storage area.

15. The method of claim 14, wherein the group comprised of second broadcast programs is among a plurality of groups comprised of second broadcast programs and each of the plurality of the groups comprised of second broadcast programs is displayed with respect to a separate cache bar area of the progress bar.

16. The method of claim 1, wherein the time-shift guide OSD has a table format indicating information of the group comprised of second broadcast programs.

17. A television receiver, comprising:
a network interface configured to receive a first broadcast program having audio and video data, wherein the first broadcast program corresponds to a current broadcast program;

a demultiplexer configured to demultiplex the audio and the video data;

an audio decoder configured to decode the audio data;

an audio processor configured to process the decoded audio data into an audible data;

a video decoder configured to decode the video data;

a video display processor configured to process the decoded video data into a displayable data;

a memory configured to store a group comprised of second broadcast programs, wherein the second broadcast programs correspond to previously stored broadcast programs;

a user interface configured to receive a user's command signal;

an on-screen display (OSD) generator configured to generate a time-shift guide OSD for the previously stored broadcast programs, wherein the time-shift guide OSD has a single progress bar for the previously stored broadcast programs, and an indicator of the single progress bar is movable in multiple regions corresponding each of the previously stored broadcast programs;

a controller configured to access the memory and to forward the second broadcast programs to the OSD generator if the user's command signal is received; and a display module configured to simultaneously display both the video data in the first broadcast program and the time-shift guide OSD corresponding to the group comprised of second broadcast programs, wherein the time-shift guide OSD comprises an additional region indicating an available memory space, and to display first thumbnail image data in the time-shift guide OSD if the indicator is positioned at a first region among the multiple regions, and to display second thumbnail image data in the time-shift guide OSD if the indicator is positioned at a second region among the multiple regions, wherein a position of the first thumbnail image data is changeable depending on a position of the indicator, wherein a position of the second thumbnail image data is changeable depending on a position of the indicator, and wherein the display module is connected to the video display processor.

18. The television receiver of claim 17, wherein information of the group comprised of second broadcast programs is stored in a system memory in a table format.

19. The television receiver of claim 17, wherein information of the group comprised of second broadcast programs is updated in a system memory according to a system program execution, and
   wherein the time-shift guide OSD is displayed according to the updated information.

20. The television receiver of claim 17, wherein the controller is further configured to control reproducing of a selected broadcast signal in response to the user's command signal, and
   wherein the reproducing is performed from a user-specified position of the group comprised of second broadcast programs.

\* \* \* \* \*